UNITED STATES PATENT OFFICE.

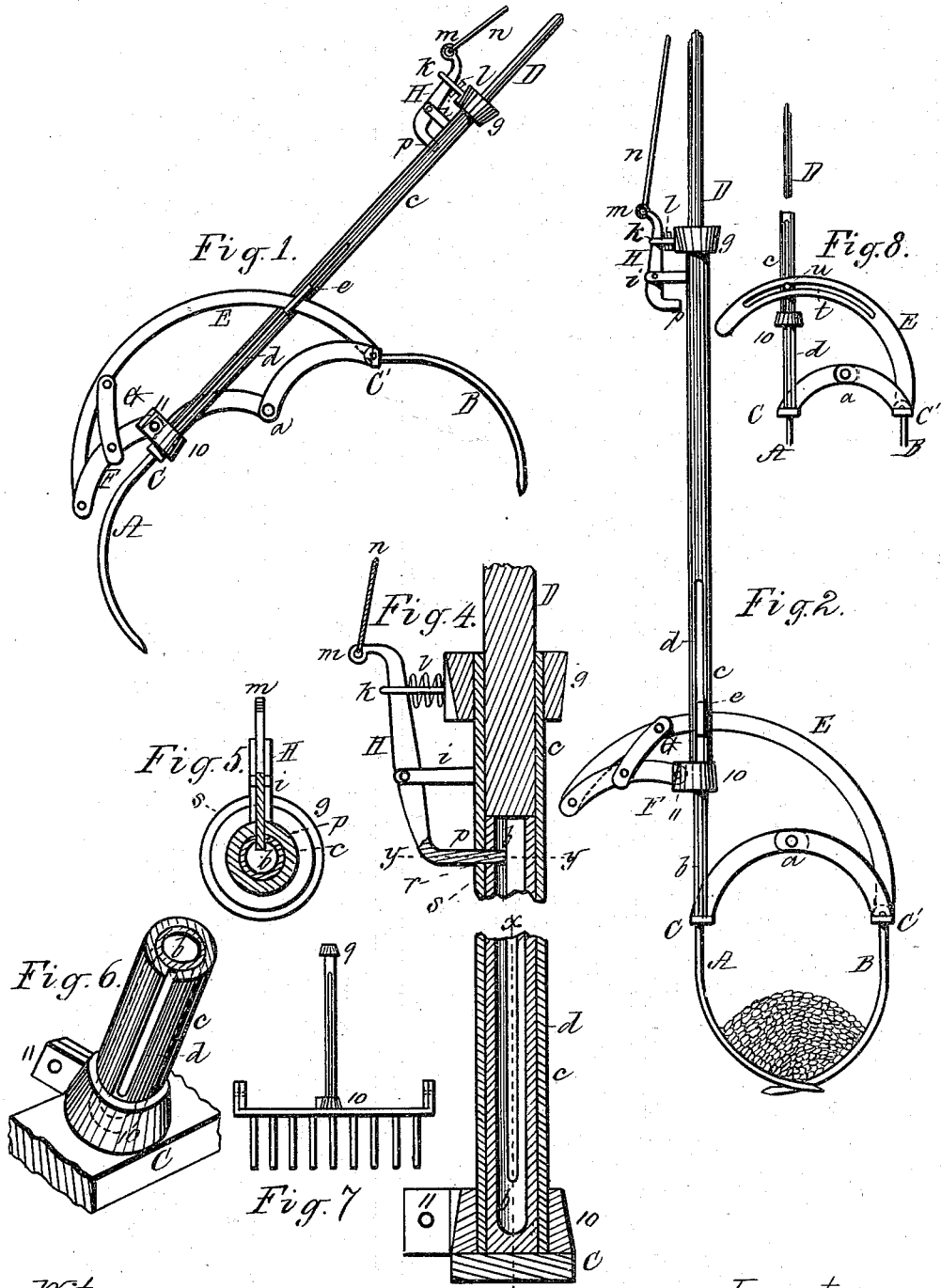

FREDERICK PASCHEN, OF TAMPA, FLORIDA.

OYSTER-TONGS.

SPECIFICATION forming part of Letters Patent No. 552,772, dated January 7, 1896.

Application filed October 25, 1895. Serial No. 566,839. (No model.)

*To all whom it may concern:*

Be it known that I, FREDERICK PASCHEN, of Tampa, Hillsborough county, Florida, have invented certain Improvements in Oyster-Tongs, of which the following is a full, clear, and exact description, reference being had to the accompanying drawings, making part of this specification, in which—

Figure 1 represents my oyster-tongs wide open; Fig. 2, the same closed and containing a supply of oysters. Fig. 3 is a section enlarged of the stem secured to one of the forks and the lower portion of the tubular connection which moves thereon. Fig. 4 represents the upper part of the stem and lower portion of the tubular connection with the device for locking them together enlarged; Fig. 5, transverse section on the line $y\ y$ of Fig. 4; Fig. 6, a view of the stem and tubular connection enlarged; Fig. 7, a side elevation of one of the forks reduced; Fig. 8, a modification to be referred to.

My present invention relates to that class of devices usually denominated "oyster-tongs," which are employed in gathering oysters and other shell-fish, sponges, coral, &c., from their beds under the water; and this invention consists in a pair of forks pivoted together, to one of which, by means of a stem and tubular connection, is secured a handle provided with a locking device, while to the other fork is secured a curved jointed arm which engages with the tubular connection and moves it up and down upon the stem during the movement of the tongs while being opened or closed, the locking device acting automatically to reliably hold one of the forks away from the other when the tongs are open to collect the supply in their path, the said locking device being instantly released to allow of the closing of the tongs by simply tripping a line, rod or wire led up the handle and controlled by the operator.

In the said drawings, A B represent a pair of forks (constituting my tongs) pivoted together at $a$, the curved tines of one fork being located slightly to one side of the vertical plane of the opposite tines of the other fork, so that their lower ends may pass between each other when the tongs are closing. The upper ends of the tines of each fork A B are secured to longitudinal cross-bars C C' forming the tops of the forks, and a metal stem $b$ is secured to one cross-bar C at or near its middle. Around this stem is loosely fitted the lower end of the tubular metallic portion $c$ of a handle D, Figs. 1 and 6, of any desired length. This tubular portion $c$ has a collar 9 at its top and a collar 10 at its bottom and is provided (on the side to the left of the operator) with a longitudinal slot $d$, extending from the lower collar 10 to a distance above slightly greater than that from the foot of the stem $b$ to a staple $e$ projecting therefrom and located within said slot, whereby the turning of the handle on the stem is prevented while permitting of the up-and-down movement of the same thereon. To the top of the other cross-bar C' is secured one end of curved arm E, to the opposite end of which is pivoted the outer end of a short link F, Figs. 1 and 2, the inner end of which is pivoted to an offset 11 of the lower collar 10, and a slightly-shorter link G connects the middle of the link F with the arm E at a point located nearly vertically over it when the tongs are open, Fig. 1.

From the foregoing construction it will be understood that it is owing to the pressure downward on the handle that the fork A when on the bottom is tilted and causes the fork B to recede from it and in so doing the curved arm E sliding within the staple allows the handle (on the continuation of the downward pressure) to descend until the collar 10 at the bottom of the tubular portion arrives at the foot of the stem—*i. e.*, at the top of the cross-bar C—in which position the tongs are wide open and are automatically locked by a simple device now to be described.

From the outside of the tube $c$ projects a short standard $i$, to the outer end of which is pivoted a lever H, the upper (longer) arm of which passes within a guide $k$ and rests on a spring $l$. The upper end of the longer arm terminates in an eye $m$, to which is fastened the lower end of the cord $n$ which is led up along the handle within convenient access of the operator. The lower (shorter) arm of said lever terminates in a projection $p$, which in its normal position enters and is kept within a hole $r$ made through the tube $c$ and also enters a hole $s$ in the metal stem $b$ in line therewith when the tongs are open, Figs. 1 and 4, the spring asserting itself to thus lock the tube to the stem, while a slight pull on the cord unlocks the same to permit of the closing of the tongs, Fig. 2.

The tongs when open are deposited upon the bottom and the fork A dragged along it until a sufficient heap or supply of oysters is collected before it, when the locking device is liberated and the handle on being raised causes the fork B (through the connections described) to approach the fork A and finally to close the tongs, which with the load gathered may be elevated into the boat, the weight of the load being sufficient to keep the tongs closed, Fig. 2. Simultaneous with the approach of the fork B toward the fork A on the pulling of the handle upward the links F G move freely on their pivots and allow the arm E to slide freely through the staple $e$ until the tongs are closed, at which time the collar 10 has traveled up the stem $b$ into the position seen in Fig. 2, said links also swinging unrestrainedly and allowing the arm E to move through said staple without unnecessary friction when the handle is thrust downward to open the tongs, and the arm and links assume the position shown in Fig. 1.

The arm E may be provided with a slot $t$ and engage with a pin $u$ projecting from the stem $b$, as shown in Fig. 8, instead of the construction previously described.

I claim—

1. The oyster tongs—consisting essentially of a pair of forks A B pivoted together, a handle D, a tube $c$ fixed thereto and a stem $b$ by which the handle is connected with one fork A, a curved arm E secured to the other fork B and engaging with said tube whose movement up and down the stem, by manipulating the handle, effects the closing and opening of the tongs,—an automatic locking device for holding the fork B away from the fork A when the tongs are to remain open, and a means controlled by the operator above the water for unlocking the closed tongs substantially as described.

2. The forks A B pivoted together, a handle D, a tube $c$ fixed thereto and a stem $b$, by which the handle is connected with one fork A, a curved arm E having one end secured to the other fork B and its other end, by jointed links F G, to the bottom of the tube,—said arm being caused to slide on or in a guide projecting from said stem as the handle is moved up and down to close and open the tongs,—an automatic locking device for holding the tongs open, and a means controlled by the operator above the water for unlocking the closed tongs constructed to operate as set forth.

3. A spring actuated locking lever H and its tripping cord $n$ in combination with a pair of tongs, a handle D, a tube $c$ having a hole $r$, a stem $b$ having a hole $t$, an arm E and links F G, all constructed and arranged to operate as specified.

Witness my hand this 16th day of October, 1895.

FREDERICK PASCHEN.

In presence of—
NORMAN W. STEARNS,
A. F. STEARNS.